(12) United States Patent
Melvin

(10) Patent No.: US 8,353,381 B2
(45) Date of Patent: Jan. 15, 2013

(54) TRANSMISSION CROSS-MEMBER

(76) Inventor: Scott Melvin, Cuyahoga Falls, OH (US)

( * ) Notice: Subject to any disclaimer, the term of this patent is extended or adjusted under 35 U.S.C. 154(b) by 340 days.

(21) Appl. No.: 12/369,080

(22) Filed: Feb. 11, 2009

(65) Prior Publication Data
US 2010/0200324 A1 Aug. 12, 2010

(51) Int. Cl.
B62D 21/03 (2006.01)
B60K 17/00 (2006.01)
(52) U.S. Cl. .......................... 180/311; 180/312; 180/377
(58) Field of Classification Search .................. 180/311, 180/312, 377; 280/124.109
See application file for complete search history.

(56) References Cited

U.S. PATENT DOCUMENTS

| 1,435,480 | A | * | 11/1922 | Kerr | 180/377 |
| 3,913,696 | A | * | 10/1975 | Kennedy et al. | 180/312 |
| 5,454,453 | A | | 10/1995 | Meyer et al. | |
| 5,823,287 | A | | 10/1998 | Chidamparam et al. | |
| 6,533,059 | B2 | | 3/2003 | Lecuit | |
| 7,393,016 | B2 | * | 7/2008 | Mitsui et al. | 280/784 |

* cited by examiner

Primary Examiner — Paul N Dickson
Assistant Examiner — Joselynn Y Sliteris
(74) Attorney, Agent, or Firm — Renner Kenner Greive Bobak Taylor Weber

(57) ABSTRACT

A transmission cross-member for supporting a vehicle's transmission includes a center portion, a pair of outer portions extending from the center portion and a pair of mounting flanges extending from the respective outer portions and connecting to the rails of the frame of the vehicle, wherein at least one of the mounting flanges is pivotally connected to one of the outer portions.

13 Claims, 3 Drawing Sheets

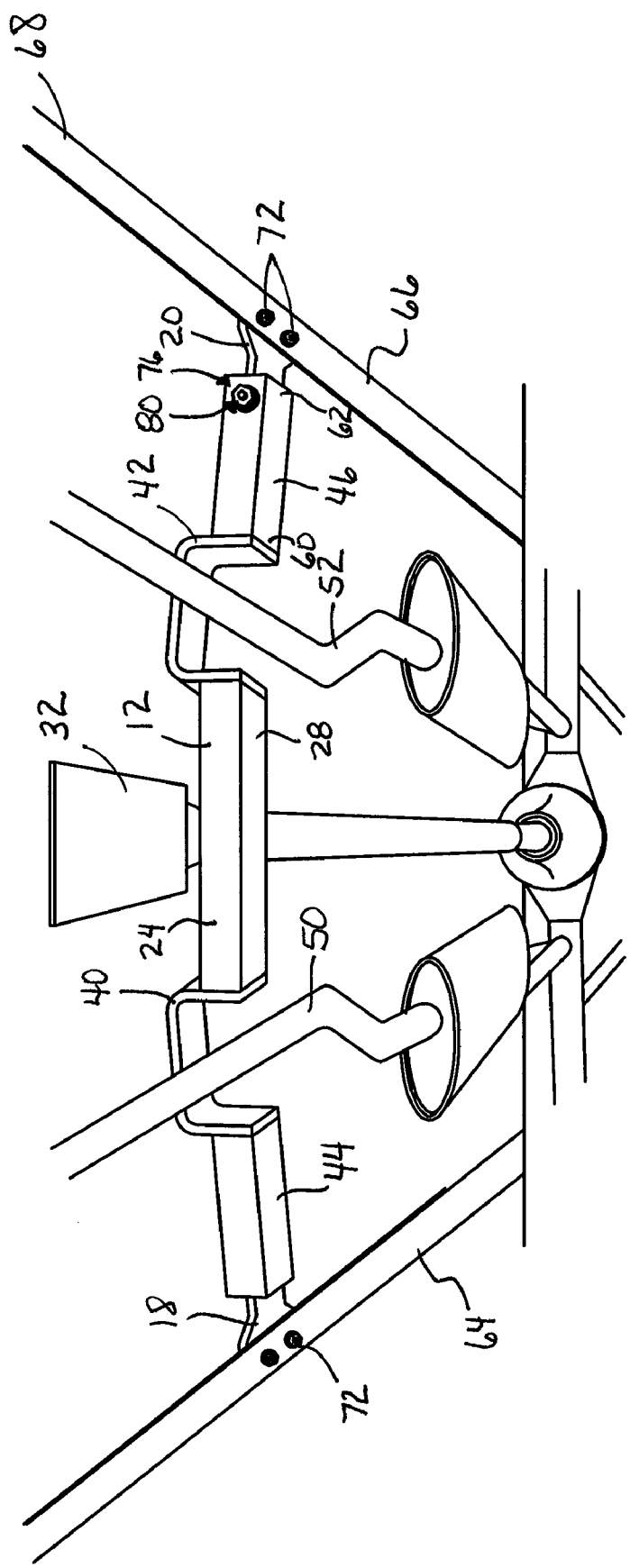

TRANSMISSION CROSS-MEMBER

TECHNICAL FIELD

The present invention relates to a transmission cross-member used to support an automobile's transmission. More particularly, the present invention relates to a transmission cross-member for an automobile of the type that provides for the cross-member to extend across the underside of the automobile and to be coupled to the side frame rails of the automobile. Specifically, the present invention relates to a transmission cross-member that is easier to remove and install than other transmission cross-members for the same type of automobile.

BACKGROUND OF THE INVENTION

Transmission cross-members are used to support an automobile's transmission. In certain types of automobiles, these transmission cross-members extend laterally from and span the distance between the sides of an automobile frame. Such transmission cross-members typically included a central portion that attached to the transmission and held it in place, at least one intermediate portion (and at least two such portions where dual exhaust pipes were employed) that was curved upwardly, formed or otherwise configured to permit clearance of the exhaust pipe(s) from the manifold, and two outer portions extending to the side frame of the automobile. Each outer portion typically included two flanges at each end of the cross-member for attaching the cross-member to the rails of the automobile frame Such transmission cross-members are most typically found in rear wheel drive vehicles and, more specifically, in older model General Motors vehicles. For example, 1973-1977 General Motors A-body rear wheel drive vehicles all used this particular type of transmission cross-member. It is believed that earlier model (1968-1972) GM A-bodies and later model (1978-1988) GM G-bodies also employed transmission cross-members that coupled the transmission at a central portion and extended to outer portions that were mounted to the side frame of the vehicles.

The problem with these transmission cross-members, however, is that they are very difficult to remove and reinstall. A transmission cross-member may need to be removed, modified, or replaced from time to time for any of several reasons. For instance, an automobile's transmission only lasts for a finite lifetime, and occasionally needs to be serviced or replaced. Depending on the type and shape of the replacement transmission to be put back into an automobile, the transmission cross-member may need to be removed, modified or replaced to accommodate the new transmission.

In addition, automotive enthusiasts seeking improved performance from their automobiles often modify engine and transmission components. A particularly popular modification is to replace an engine with a single exhaust headpipe with an engine having dual exhaust headpipes. In such situations, it is typically necessary to modify or replace the transmission cross-member in order to accommodate the dual-exhaust headpipe configuration.

Removing and re-installing transmission cross-members is often challenging work. For example, a GM A-body transmission cross-member is about 52.5 inches wide and the frame rails are about 49 inches apart. Due to the design of the original factory cross-member, the factory cross-member will fit almost perfectly, and very tightly, into the 49-inch spaced frame. Heretofore, to remove a transmission cross-member, the mechanic first had to remove the transmission mounts and raise the transmission as much as possible. Then, the mechanic had to force the passenger side of the cross-member forward as far as possible. The problem was that, in doing so, the transmission cross-member then realizes its full width of 52.5 inches, as the cross-member was then tilted to its edges. Thus, the only way for the mechanic to finish removing the transmission cross-member was to twist, hammer and pry the cross-member from the frame. In the process, the vehicle floor pans and panels, as well as the cross-member itself was oftentimes dented and almost always scratched.

Likewise, when installing a transmission cross-member, the tight fit between the cross-member and the frame heretofore required a mechanic to hammer and pry the cross-member into position, again resulting in scratches, and oftentimes, dents to both the frame and the cross-member. Aesthetic considerations for the cross-member and underside of the automobile were forgotten.

However, in today's world, automotive enthusiasts want not only well-built engines and automobiles but also aesthetically-built engines and automobiles. Consequently, damage such as scratches and dents to the floor pans and panels of the automobile must be kept to a minimum.

Thus, a need exists for a transmission cross-member of the type that extends across the frame of the automobile that is easier to install and remove than prior art transmission cross-members of that same type.

BRIEF SUMMARY OF THE INVENTION

In general, the present invention provides a transmission cross-member for supporting a transmission of a vehicle, the cross-member of the type extending and connected to opposed rails of a frame of the vehicle, the cross-member comprising: a center portion for coupling the transmission to the cross-member; a first outer portion extending essentially laterally in one direction from the center portion toward a rail of the frame of the vehicle; a second outer portion extending essentially laterally from the center portion in a direct essentially opposite the direction of the first outer portion and toward an opposed rail of the frame of the vehicle; a first flange connecting the first outer portion to the rail of the frame of the vehicle; and a second flange connecting the second outer portion to the opposed rail of the frame of the vehicle; wherein at least said first flange is pivotably connected to the first outer portion.

The present invention also generally provides a method for installing a transmission cross-member on the rails of a frame of a vehicle, comprising: providing a transmission cross-member including a center portion; a first outer portion extending essentially laterally in one direction from the center portion toward a rail of the frame of the vehicle; a second outer portion extending essentially laterally from the center portion in a direct essentially opposite the direction of the first outer portion and toward an opposed rail of the frame of the vehicle; a first flange connecting the first outer portion to the rail of the frame of the vehicle; and a second flange connecting the second outer portion to the opposed rail of the frame of the vehicle; wherein at least said first flange is connected to the first outer portion by a hinge assembly; adjusting the hinge assembly to a loosened position; pivoting the first flange upward with respect to the first outer portion; orienting the cross-member into a desired installed position with respect to the rails; re-aligning the first flange with respect to the first outer portion; adjusting the hinge assembly to a tightened position, whereby said first mounting flange is then fixed in position with respect to said cross-member; and attaching the first mounting flange and the second mounting flange to the rails.

The present invention further generally provides a method for removing a transmission cross-member from the rails of a frame of a vehicle, said transmission cross-member of the type including a center portion; a first outer portion extending essentially laterally in one direction from the center portion toward a rail of the frame of the vehicle; a second outer portion extending essentially laterally from the center portion in a direct essentially opposite the direction of the first outer portion and toward an opposed rail of the frame of the vehicle; a first flange connecting the first outer portion to the rail of the frame of the vehicle; and a second flange connecting the second outer portion to the opposed rail of the frame of the vehicle; wherein at least said first flange is connected to the first outer portion by a hinge assembly, the method comprising: disconnecting the first flange and the second flange from the rails of the frame of the vehicle; adjusting the hinge assembly to a loosened position; pivoting the first flange upward with respect to the first outer portion; and removing the cross-member from the rails of the frame of the vehicle.

Advantageously, a transmission cross-member constructed according to the concepts of the present invention solves the needs for a cross-member that is easier to install and remove than prior art cross-members of essentially the same type. The present invention is particularly useful for 1973-1977 GM A-body type transmission cross-members.

BRIEF DESCRIPTION OF THE SEVERAL VIEWS OF THE DRAWINGS

This and other features and advantages of the present invention will become better understood with regard to the following description, appended claims, and accompanying drawings wherein:

FIG. 4 is a perspective view showing various components on the underside of a vehicle, including a transmission cross-member constructed according to the concepts of the present invention.

DETAILED DESCRIPTION OF THE INVENTION

Figure 1:
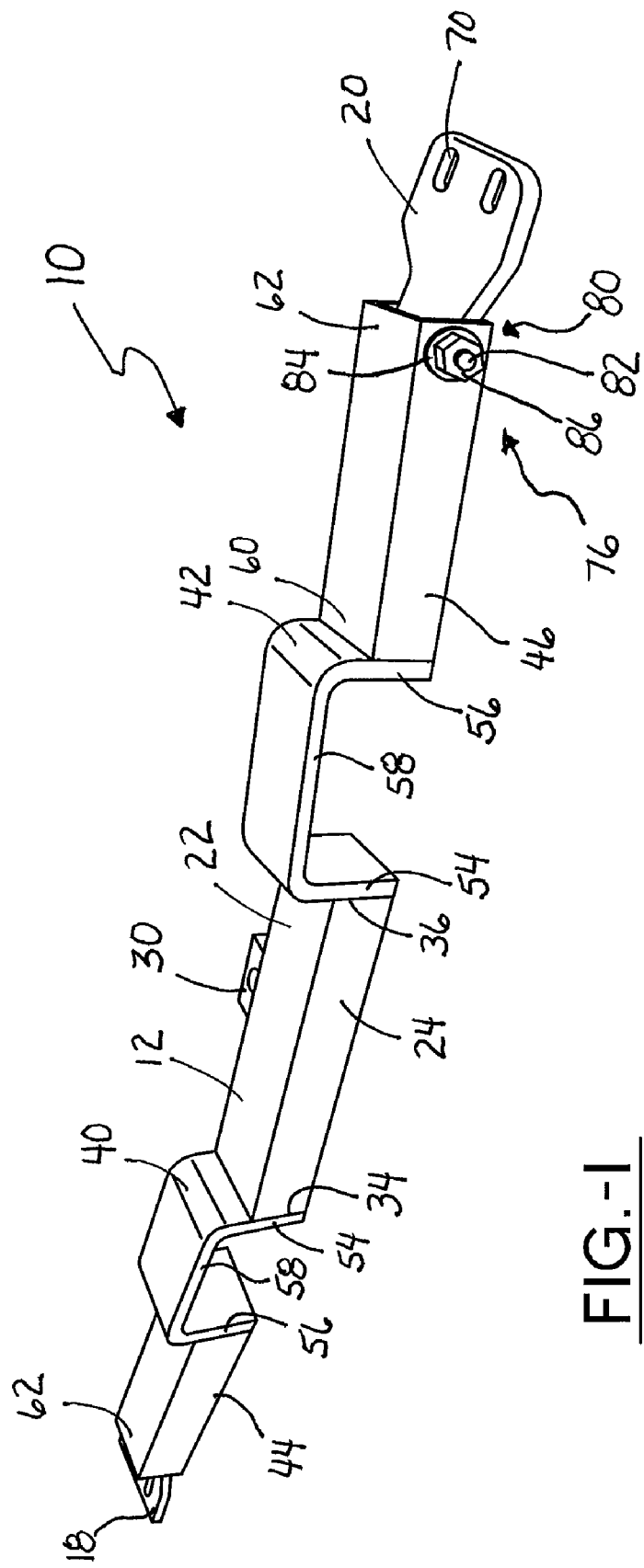
FIG. 1 is a perspective view showing a transmission cross-member according to the concepts of the present invention.
Figure 2:
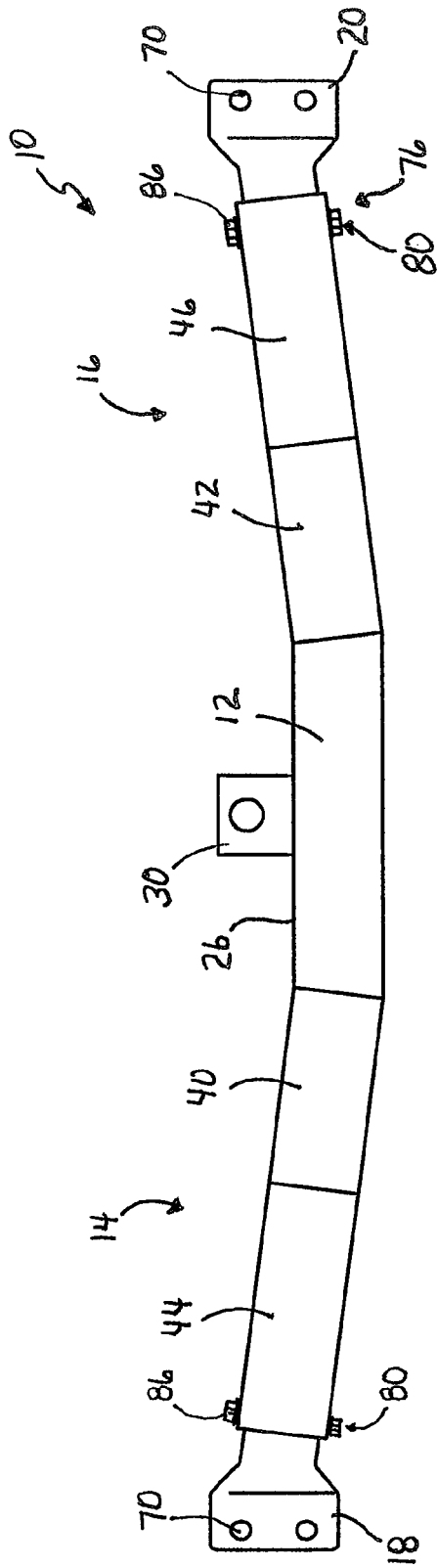
FIG. 2 is a top view of the cross-member of FIG. 1, except that both ends of the cross-member are shown as hinged.
Figure 3:
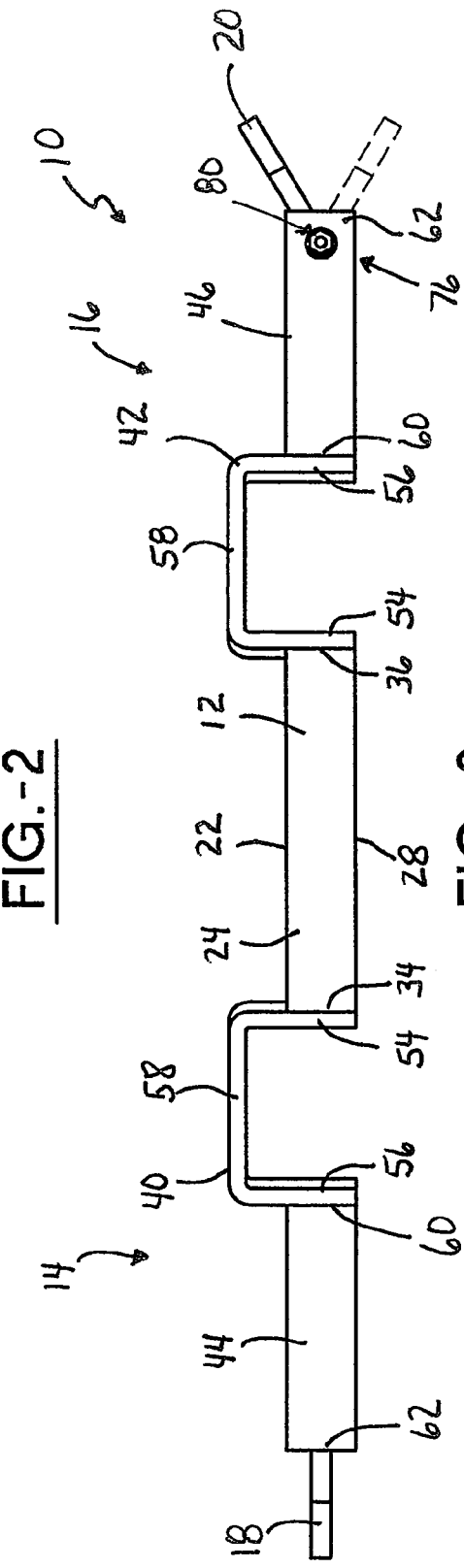
FIG. 3 is a front elevational view of the cross-member of FIG. 1.

A transmission cross-member embodying the concepts of the present invention is designated generally by the numeral 10 in FIGS. 1-3. In one embodiment, cross-member 10 comprises a center portion 12, a pair of outer portions, designated generally by the numerals 14 and 16, extending from center portion 12, and a pair of flanges 18, 20 extending beyond each respective outer portion, 14, 16. Uniquely, at least one of the flanges, such as 20, is pivotably connected to its respective outer portion 16.

In at least one embodiment, center portion 12 is essentially a straight, elongated, hollow piece of metal that is generally rectangular shaped in lateral cross-section. As shown in the drawings, center portion 12 may include an uppermost surface 22, a front facing surface, 24, a rear facing surface 26, and a lowermost surface 28. In the embodiment shown, center portion 12 further includes a transmission mounting flange 30 that extends from the rear facing surface 26 near the longitudinal midpoint of center portion 12. Transmission mounting flange 30 may be used to attach cross-member 10 to a transmission. It will be appreciated that, in another embodiment, transmission mounting flange may be positioned on the uppermost surface 22 of center portion 12, or, in yet another embodiment, the transmission mounting means may be an aperture through the uppermost surface 22 of the center portion 12.

Turning to FIG. 4, it can be seen that center portion 12 essentially straddles the back portion of a transmission, shown schematically as 32, and couples the transmission 32 to the cross-member 10 by a mounting fastener (not shown) that bolts or otherwise fastens the cross-member 10 to the transmission 32. Thus, center portion 12 couples the cross-member 10 to the transmission 32.

Outer portions 14, 16 generally extend essentially laterally in generally opposite directions from the respective ends 34, 36 of the center portion 12. By "essentially laterally," it is meant that the portions generally extend laterally away from the ends 34, 36 of the center portion 12 in a relatively horizontal plane, but that there may be portions of the cross-member's outer portions that extend upward or downward beyond a particular plane for the cross-member. Thus, the first outer portion 14 extends essentially laterally in one direction from the first end 34 of center portion 12 while the second outer portion 16 extends essentially laterally from the other end 36 of center portion 12 in a direction essentially opposite the direction of the first outer portion 14. It will be appreciated that while the outer portions 14, 16 extend in essentially opposite directions, there may a curvature to the cross-member 10 such that the outer portions 14, 16 do not necessarily extend in exactly opposite directions, but rather extend generally away from each other.

In one embodiment, the outer portions 14, 16 include a pair of intermediate portions 40, 42 and a pair of outside portions 44, 46. The intermediate portions, such as first intermediate portion 40 and second intermediate portion 42 extend laterally outwardly from center portion 12. Intermediate portions 40, 42 accommodate a exhaust system such as dual exhaust system 50, 52. A pair of outside portions, including first outside portion 44 and second outside portion 46, extend from the pair of intermediate portions, 40, 42, respectively.

More particularly, intermediate portions 40, 42 are for accommodating the headpipes of dual exhaust system 50.52. On original manufacturing equipment, these intermediate portions are generally bent in a configuration that will allow for the exhaust systems to clear the cross-member underneath the cross-member 10. The same must be accomplished with replacement cross-members. That is, in a single exhaust system, at least one of the intermediate portions 40 must permit clearance of the exhaust system 50 under the cross-member 10. In a dual exhaust system, both of the intermediate portions 40, 42 must permit clearance of the exhaust systems 50, 52 under the cross-member 10.

In order to provide suitable clearance for a dual exhaust system, and as shown in the embodiment drawn, each intermediate portion 40, 42 is generally inverted U-shaped, and has a pair of upright parts 54, 56 that are vertically oriented and a transverse part 58 that extends between and connects each pair of upright parts 40. Each intermediate portion 40, 42 extends from the pair of ends 34, 36 of center portion 12, with the innermost upright part 54 of each intermediate portion 40, 42 being coincident with a respective end 34, 36 of center portion 12. Depending on the desired configuration, intermediate portions 40, 42 may extend from center portion 12 at somewhat of an angle, such as the arrangement best seen in FIG. 2. The extent and direction of this angle will depend on the unique characteristics presented by a particular vehicle and its particular transmission and exhaust components.

Although intermediate portions 40, 42, as shown in the Figs., have the same general dimensions, intermediate portions 40, 42 need not be the same. For instance, intermediate portion 40 could be differently shaped than intermediate portion 42 depending on the relative positioning of the headpipes in a particular dual exhaust system. Or, in the case of a single headpipe exhaust system, upright parts 54, 56 of either first intermediate portion 40 or second intermediate portion 42 might extend no further than uppermost surface 22 of center portion 12.

Outside portions 44, 46 may be generally straight, slender, elongated, hollow pieces of metal not unlike center portion 12. Outside portions 44, 46 may be generally rectangular shaped in lateral cross section so as to form box members, and may be generally horizontally oriented. Each outside portion 44, 46 has an innermost end 60 and an outermost end 62. The outside portions 44, 46 extend generally coaxially from the pair of intermediate portions 40, 42, respectively, with the innermost end 60 of each outside portion being coincident with an outermost upright part 56 of a respective intermediate portion 40, 42.

Like all 1973-1977 General Motors A-body transmission cross-members heretofore, cross-member 10 includes a pair of flanges 18, 20 that extend essentially laterally from the outermost ends 62 of the outside portions 44, 46. As best shown in FIG. 4, each flange 18, 20 is used to couple the cross-member 10 to a respective rail 64, 66 of a frame 68 of a vehicle. Each flange may include one or more throughbores 70 for receiving fasteners such as bolts 72 through each throughbore 70 for attaching the cross-member 10 to each rail 64, 66.

It will be appreciated that, in one embodiment, one of the flanges 18 may be fixedly connected, such as by welding or the like, to the outermost end 62 of the outside portion 44 and removably attached to the rail 64 in a manner not unlike prior art flanges. Because that flange 18 is fixedly connected to the outer portion 14 of the cross-member 10, it is a rigid and integral part of the cross-member 10 and must be manipulated with the rest of the cross-member 10 to be removed or installed onto the rail 64.

However, the other of the flanges 20 is not fixedly connected. Instead, the other flange 20 is pivotably connected proximate the outermost end 62 of the respective outside portion 46 to which it is attached. More particularly, outer portion 16 may include a hinge assembly 76. Hinge assembly 76 may include any known mechanical components for selectively actuating the hinge assembly 76 in a manner that will permit the flange 20 to be selectively pivoted when desired. In one embodiment, the hinge assembly may include a fastener assembly, designated generally by the numeral 80 in the FIGS, that may be used to maintain the flange 20 either as rigidly affixed to the outer portion 16, or to permit the flange to pivot, in one embodiment at least upwardly and in another embodiment, either upwardly or downwardly.

Hinge assembly 76 may more particularly include a bolt 82, a spring washer 84 and a nut 86. As best shown in FIG. 3, hinge assembly 76 may be selectively actuated by loosening the assembly to allow the flange 20 to pivot between an uppermost position (solid line) and a lowermost position (dashed line) and tightening the assembly to fix the flange in a position suitable for coupling the flange 20 to the rail 66 of the frame 68 of the vehicle. That is, upon installation, the hinge assembly 76 may be tightened, such as by screwing nut 86 and washer 84 onto bolt 82, so as to prohibit rotational movement of the flange 20 in relation to the outer portion 16.

When the fastener assembly 80 is tightened, the flange 20 is rigidly held in place and cannot be pivoted. The flange 20 can then be coupled or fastened to the rail 66 of the frame 68 of the vehicle. However, when the fastener assembly 80 is loosened as by unscrewing nut 86 and washer 84 from bolt 82, the flange is permitted to pivot as shown in FIG. 3.

By permitting the flange 20 to pivot, the length of the cross-member 10 is shortened. It is believed that by pivoting the flange upward, the cross-member 10 will be shortened by about 2 to about 4 inches, depending upon the size of the flange 20 and the position of the hinge assembly relative to the outermost end 62 of the outside portion 46 of the cross-member 10. As such, it will be appreciated that the cross-member 10 will be easier to install and remove from between the rails 64, 66 of the frame 68.

In another embodiment, it will be appreciated that the other flange 18 may also be pivotably connected to the outer portion 14 of the cross-member in the same manner as described above for flange 20, using a like fastener assembly 80 with the same elements, including screwing nut 86, as shown in FIG. 2. By using two flanges that are pivotably connected, the cross-member 10 can be made even shorter for ease of installation and/or removal.

In operation, it will be appreciated that a transmission cross-member 10 constructed according to the concepts of the present invention may be installed into a vehicle as follows. First, the engine and transmission components are supported using jacks or other known tools according to methods well known in the art. Then, the existing transmission cross-member may be removed. Cross-member 10 may then be installed.

Cross-member 10 is situated in the correct orientation when the transmission 32 is oriented properly with respect to transmission mounting flange 30 and so the pipes of the dual exhaust system 50, 52 are oriented properly within first and second intermediate portions 40, 42. First flange 18 may then be brought into position above rail 64, and attached thereto using bolts 82, or similar fasteners or attachment hardware. Hinge assembly 76 is this adjusted to a loosened position. With hinge assembly 76 in this loosened orientation, the flange 20 may be easily brought into its proper position with respect rail 66 by pivoting flange 20 upward with respect to the outer portion 16, to its uppermost position and moving it upward above rail 66. Once flange 20 is situated above rail 66, flange 20 may be realigned or adjusted back into its customary position, extending essentially laterally outward from outer portion 16. This realignment provides for orienting the cross-member 10 into its desired installed position with respect to the rail 66 of the frame 68.

The hinge assembly 76 may then be adjusted into a tightened position, whereby the flange 20 is then fixed into position with respect to the outer portion 16 of the cross-member 10. To tighten the hinge assembly 76, the nut 86 is tightened onto bolt 82 of fastener assembly 80 so that flange 20 is rigidly held in place with respect to outer portion 16. All this may be accomplished without using a hammer or other prying tool to pound or pry cross-member 10 into position.

Then, flanges 18, 20 may be attached to rails 64, 66, respectively, using fasteners or attachment hardware known in the art. In one embodiment, once both flange 18, 20 are in their appropriate respective positions, bolts 72 may be placed through bores 70 and tightened so the flanges 18, 20 are securely attached to rails 64, 66, respectively. Finally, transmission 32 may be attached to transmission mounting flange 30 on the center portion 12 of cross-member 10 using fasteners, tools and methods well known in the art.

In further operation, the transmission cross-member 10 constructed according to the concepts of the present invention may be removed from an automobile as follows. Again, the engine and transmission components are supported using jacks or other known tools according to methods well known in the art. Then, the attachment or coupling between transmission 32 and cross-member 10 at transmission mount portion 30 may be disengaged. Also, the coupling between first and second flanges 18, 20 and rails 64, 66 must be disconnected. This can be done by any means known in the art but, in one embodiment, may be done by loosening and removing bolts 72 from the rails 64, 66 and the flanges 18, 20.

Upon the disconnection of the cross-member 10 from the rails 64, 66, the hinge assembly 76 may be adjusted to a loosened position. In particular, for one embodiment, this can be done by loosening the nut 86 on the bolt 82 on the fastener assembly 80. The hinge assembly 76 should be sufficiently loosened so as to permit the flange 20 to pivot at least upwardly with respect to the outer portion 16 in one embodiment and upwardly and downwardly with respect to the outer portion in another embodiment.

By pivoting the flange 20 to its uppermost position, the length of the cross-member will be shortened. This shortening of the cross-member 10 thereby creates a clearance gap that allows the cross-member 10 to be removed from the rail 66. With respect to removing the transmission cross-member 10, it will be appreciated that the mechanic can now force the passenger side of the cross-member 10 forward as far as possible, and force the driver's side of the cross-member 10 back or rearward as far as possible. However, because of the shortening of the overall length of the cross-member with flange 20 in a pivoted, upward position, the cross-member 10 will not become longer than the distance between the rails 64, 66 of the frame 68. As such, the cross-member 10 can simply be tilted and removed from the rails 64, 66 of the frame 68 of the vehicle without pounding or prying with a hammer or other tool.

Thus, it should now be evident that a transmission cross-member constructed according to the concepts of the present invention offer several advantages over prior art forms. For one, they are easier to install and remove because they have at least one mounting flange that is pivotally connected to an outer portion, thereby shortening the length of the cross-member and creating a degree of flexibility in positioning the cross-member so that it may be properly situated with respect to a vehicle's rails without the aid of a hammer or pry tool. In addition, transmission cross-members constructed according to the concepts of the present invention may be constructed to accommodate any exhaust pipe arrangement, including dual exhaust, single exhaust, or irregularly positioned exhaust systems.

Thus, it can be seen that the objects of the invention have been satisfied by the structure and its method for use presented above. While in accordance with the Patent Statutes, only the best mode and certain exemplified embodiments has been presented and described in detail, it is to be understood that the invention is not limited thereto or thereby. Accordingly, for an appreciation of the true scope and breadth of the invention, reference should be made to the following claims.

What is claimed is:

1. A transmission cross-member fitting an A-body General Motors vehicle for supporting a transmission of the vehicle, the cross-member extending and connected to opposed rails of a frame of the A-body General Motors vehicle, the cross-member comprising:
   a center portion for coupling the transmission to the cross-member;
   a first outer portion extending essentially laterally in one direction from the center portion toward a rail of the frame of the A-body General Motors vehicle;
   a second outer portion extending essentially laterally from the center portion in a direction essentially opposite the direction of the first outer portion and toward an opposed rail of the frame of the A-body General Motors vehicle;
   a first flange extending laterally outward from the first outer portion of the cross member, the first flange having a first end and a second end substantially laterally in line with each other, the first flange being pivotably connected to the first outer portion of the cross member at the first end about a horizontal axis extending along a longitudinal direction of the vehicle, the second end of the first flange being connected to the rail of the frame of the A-body General Motors vehicle by a fastener oriented in a substantially vertical direction of the vehicle;
   a second flange connected to the second outer portion of the cross member, the second flange connecting the second outer portion to the opposed rail of the frame of the A-body General Motors vehicle;
   wherein the first and second flanges are removably attached directly to the rails of the frame of the A-body General Motors vehicle.

2. The cross-member of claim 1, wherein the second flange is pivotably connected to said second outer portion.

3. The cross-member of claim 2, wherein the second flange is pivotably connected to the second outer portion by a hinge assembly that is selectively actuated.

4. The cross-member of claim 3, wherein the hinge assembly includes a fastener that may be loosened and tightened.

5. The cross-member of claim 1, wherein the second flange is welded to said second outer portion.

6. The cross-member of claim 1, wherein the first flange is pivotably connected to the first outer portion by a hinge assembly that is selectively actuated.

7. The cross-member of claim 6, wherein the hinge assembly includes a fastener that may be loosened and tightened.

8. The cross-member of claim 1, wherein the first outer portion includes a first intermediate portion configured to permit clearance of an exhaust pipe under the cross-member.

9. The cross-member of claim 1, wherein the second outer portion includes a second intermediate portion configured to permit clearance of a second exhaust pipe under the cross-member.

10. A method for installing a transmission cross-member fitting an A-body General Motors vehicle on a frame of the A-body General Motors vehicle, comprising:
   providing a transmission cross-member including a center portion for coupling the transmission to the cross member; a first outer portion extending essentially laterally in one direction from the center portion toward a rail of the frame of the A-body General Motors vehicle; a second outer portion extending essentially laterally from the center portion in a direction essentially opposite the direction of the first outer portion and toward an opposed rail of the frame of the A-body General Motors vehicle; a first flange extending laterally outward from the first outer portion of the cross member, the first flange having a first end and a second end substantially laterally in line with each other, the first flange being pivotably connected to the first outer portion of the cross member at the first end about a horizontal axis extending along a longitudinal direction of the vehicle, the second end of the first flange suitable for connecting to the rail of the frame of the A-body General Motors vehicle by a fastener oriented in a substantially vertical direction of the vehicle; and a second flange connected to the second outer portion of the cross member, the second flange connecting the second outer portion to the opposed rail of the frame of the A-body General Motors vehicle; wherein said first flange is pivotably connected to the first outer portion by a hinge assembly at the first end;

adjusting the hinge assembly to a loosened position;

pivoting the first flange upwardly with respect to the first outer portion to shorten the length of the cross-member;

orienting the cross-member into a desired installed position with respect to the rails on the frame;

re-aligning the first flange with respect to the first outer portion, thereby extending the cross member back to an original length; and adjusting the hinge assembly to a tightened position, whereby said first flange is then fixed in position with respect to said cross-member; and attaching the second end of the first flange by a fastener oriented in a substantially vertical direction of the vehicle and attaching the second flange directly to the rails of the frame of the A-body General Motors vehicle.

11. A method for removing a transmission cross-member fitting an A-body General Motors vehicle from a frame of the A-body General Motors vehicle, said transmission cross-member including a center portion for coupling the transmission to the cross member; a first outer portion extending essentially laterally in one direction from the center portion toward a rail of the frame of the A-body General Motors vehicle; a second outer portion extending essentially laterally from the center portion in a direction essentially opposite the direction of the first outer portion and toward an opposed rail of the frame of the A-body General Motors vehicle; a first flange extending laterally outward from the first outer portion of the cross member, the first flange having a first end and a second end substantially laterally in line with each other, the first flange being pivotably connected to the first outer portion of the cross member at the first end about a horizontal axis extending along a longitudinal direction of the vehicle, the second end of the first flange being connected to the rail of the frame of the A-body General Motors vehicle by a fastener oriented in a substantially vertical direction of the vehicle; and a second flange connected to the second outer portion of the cross member, the second flange connecting the second outer portion to the opposed rail of the frame of the A-body General Motors vehicle; wherein at least said first flange is pivotably connected to the first outer portion by a hinge assembly at the first end, the method comprising:

disconnecting the fastener at the second end of the first flange and the second flange of the cross member from the rails of the frame of the A-body General Motors vehicle;

adjusting the hinge assembly to a loosened position;

pivoting the first flange upwardly with respect to the first outer portion to shorten the length of the cross member; and removing the cross-member from the rails of the frame of the A-body General Motors vehicle.

12. The method of claim 11, wherein the step of removing the cross member includes forcing the passenger's side of the cross member forward as far as possible within the frame of the A-body General Motors vehicle and forcing the driver's side of the cross member back as far as possible within the frame of the A-body General Motors vehicle.

13. The method of claim 11, wherein the step of removing the cross member includes tilting the cross member and removing the cross member from the rails of the frame of the A-body General Motors vehicle without pounding or prying with a tool.

\* \* \* \* \*